(12) United States Patent
Sutton

(10) Patent No.: US 7,628,423 B2
(45) Date of Patent: Dec. 8, 2009

(54) RIDING LAWNMOWER OUTRIGGER

(76) Inventor: Charles E. Sutton, 1707 W. 11th St., Lehigh Acres, FL (US) 33936

( * ) Notice: Subject to any disclaimer, the term of this patent is extended or adjusted under 35 U.S.C. 154(b) by 309 days.

(21) Appl. No.: 11/764,945

(22) Filed: Jun. 19, 2007

(65) Prior Publication Data

US 2008/0315569 A1  Dec. 25, 2008

(51) Int. Cl.
   *B60R 21/00* (2006.01)
(52) U.S. Cl. ........................................ 280/755
(58) Field of Classification Search ............... 280/755, 280/763.1, 765.1, 766.1, 767
   See application file for complete search history.

(56) References Cited

U.S. PATENT DOCUMENTS

| | | | |
|---|---|---|---|
| 2,767,995 A | 10/1956 | Stout | |
| 2,986,295 A | 5/1961 | Shaffer | |
| 3,531,137 A * | 9/1970 | Ganz et al. | ............ 280/638 |
| 3,763,956 A | 10/1973 | Ruff | |
| 3,802,720 A | 4/1974 | Ellis | |
| 4,206,580 A | 6/1980 | Truax et al. | |
| 4,707,971 A | 11/1987 | Forpahl et al. | |
| 6,394,738 B1 | 5/2002 | Springer | |
| 6,722,113 B2 | 4/2004 | Atterbury et al. | |
| 7,547,044 B2 * | 6/2009 | Cokeley | ............ 280/755 |

* cited by examiner

*Primary Examiner*—Eric Culbreth
(74) *Attorney, Agent, or Firm*—The Livingston Firm; Edward M. Livingston, Esq.; Bryan L. Loeffler, Esq.

(57) ABSTRACT

A riding lawnmower outrigger (1) having a hollow outer tube (5) secured to a riding lawnmower (2), a telescoping inner tube (6) which locks within the outer tube (5), a vertical tube (11) connected to the inner tube (6), an outrigger wheel housing (16) secured to the vertical tube (11) and a wheel (7) secured within the outrigger wheel housing (16). When utilizing the riding lawnmower outrigger (1) on a ground surface (32) having a slope (31), the riding lawnmower (2) will not tip-over or rollover because the riding lawnmower outrigger (1) acts as a supporting arm to balance the riding lawnmower (2) and prevent tip-over thereof.

2 Claims, 3 Drawing Sheets

RIDING LAWNMOWER OUTRIGGER

BACKGROUND OF THE INVENTION

This invention relates to an accessory for a riding lawnmower, more particularly, a riding lawnmower outrigger that may be permanently or removably secured to a riding lawnmower to prevent tipping of the riding lawnmower when used on sloped surfaces.

Riding lawnmowers have become a popular tool for both residential and commercial purposes as the use of riding lawnmowers has many advantages over the use of traditional push lawnmowers. First and most importantly, the amount of energy expended by a person is drastically reduced when comparing the use of a riding lawnmower to a traditional push mower. Second, the amount of time expended by the person to cut a predetermined amount of grass is greatly reduced, thereby permitting a person to cut a larger amount of grass in a shorter amount of time as compared to traditional push lawnmowers. Finally, most people find riding lawnmowers much easier to use than traditional push lawnmowers.

However, there is a great risk associated with riding lawnmowers that is not associated traditional push lawnmowers. When a riding lawnmower is being used on a sloped surface, such as on a hillside, ditch or other inclined area, the riding lawnmower may tip-over. Because a user sits atop a riding lawnmower, the effects of the riding lawnmower tipping over may be catastrophic as the user may obtain serious bodily injury, such as gashes and broken bones, or even die.

Thus, a need exists for an outrigger for a riding lawnmower that may be permanently or removably secured to a riding lawnmower to prevent tipping of the riding lawnmower when used on sloped surfaces.

The relevant prior art includes the following references:

| U.S. Pat. No. (U.S. unless stated otherwise) | Inventor | Issue/ Publication Date |
|---|---|---|
| 2,767,995 | Stout | Oct. 23, 1956 |
| 3,802,720 | Ellis | Apr. 09, 1974 |
| 4,206,580 | Truax et al. | Jun. 10, 1980 |
| 3,763,956 | Ruff | Oct. 09, 1973 |
| 2,986,295 | Shaffer | May 30, 1961 |
| 6,394,738 | Springer | May 28, 2002 |
| 4,707,971 | Forpahl et al. | Nov. 24, 1987 |
| 6,722,113 | Atterbury et al. | Apr. 20, 2004 |

SUMMARY OF THE INVENTION

The primary object of the present invention is to provide a riding lawnmower outrigger that prevents tipping of a riding lawnmower when used on sloped ground surfaces.

A further object of the present invention is to provide a riding lawnmower outrigger that may be permanently or removably secured to a riding lawnmower.

An even further object of the present invention is to provide a riding lawnmower outrigger that is easy to use.

Another object of the present invention is to provide a riding lawnmower outrigger that may be adjustable.

An even further object of the present invention is to provide a riding lawnmower outrigger that may be used on one or both sides of a riding lawnmower.

The present invention fulfills the above and other objects by providing a riding lawnmower outrigger having a hollow outer tube having a predetermined cross-sectional shape with a first end and a second end, a telescoping inner tube having a predetermined cross-sectional shape with a first end and a second end, a means for securing the outer tube to a riding lawnmower, a means for locking the inner tube within the outer tube, a vertical tube having a top end and a bottom end wherein the vertical tube is connected to the inner tube first end, at least one outrigger wheel housing secured to the vertical tube bottom end and at least one wheel secured between the outrigger wheel housing such that the wheel rolls in a predetermined direction along with the direction of the riding lawnmower.

Alternate embodiments of the present invention permit rotation of the outrigger wheel housing in a manner similar to that of caster wheels and pivoting of the outrigger wheel so as to pivot upwards and downwards according to the topography of the ground surface.

To use the present invention, a user first secures the outer tube to a riding lawnmower, preferably under the riding lawnmower base. Then, he or she adjusts the length of the inner tube to a desired position and locks the inner tube within the inner tube, preferably via a pin and apertures located in the inner and outer tubes. Thus, when the user is using the riding lawnmower on a ground surface having a slope, the riding lawnmower will not tip-over or rollover because the riding lawnmower outrigger acts as a supporting arm to balance the riding lawnmower and prevent tip-over thereof.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
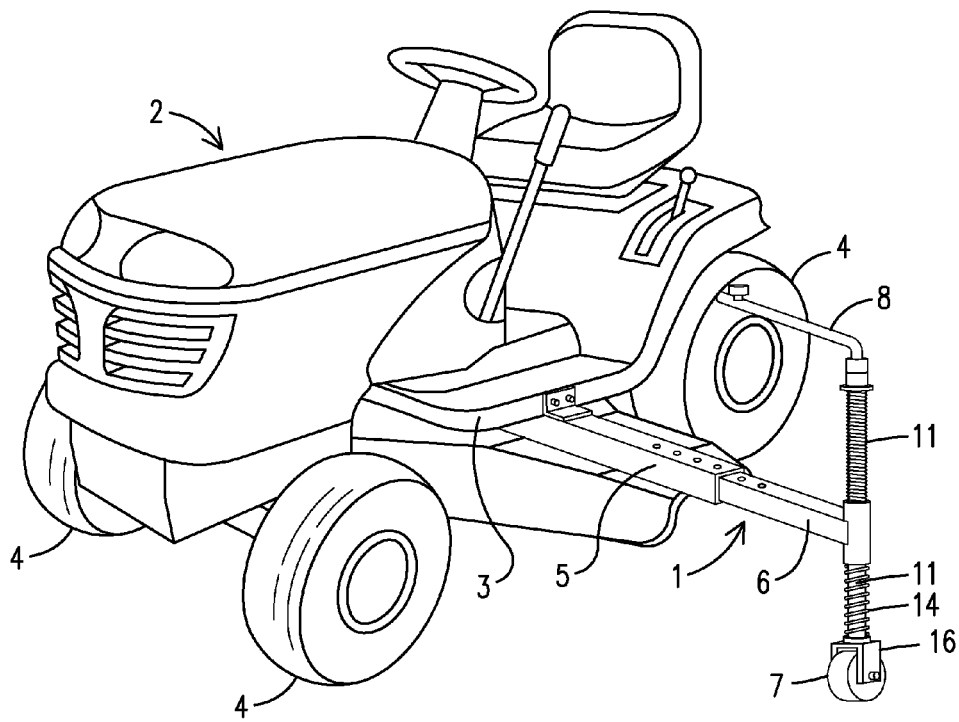
FIG. 1 is a side perspective view of the riding lawnmower outrigger of the present invention installed on a riding lawnmower.

For purposes of describing the preferred embodiment, the terminology used in reference to the numbered components in the drawings is as follows:

1. riding lawnmower outrigger, generally
2. riding lawnmower
3. riding lawnmower base
4. riding lawnmower tire
5. outer tube
6. inner tube
7. outrigger wheel
8. handle -continued 9. knob
10. vertical tube threads
11. vertical tube
12. connection tube threads
13. connection tube
14. spring
15. vertical tube aperture
16. outrigger wheel housing
17. wheel fastening means
18. inner tube aperture
19. pin
20. outer tube aperture
21. bracket
22. clamp
23. bolt
24. outer tube first end
25. outer tube second end
26. inner tube first end
27. inner tube second end
28. first plate
29. pivotal retaining means
30. vertical tube plate
31. slope
32. ground surface
33. top end
34. bottom end
35. outrigger wheel housing first side
36. outrigger wheel housing second side
37. second plate
38. outrigger wheel housing top side
39. vertical tube plate aperture
40. locking means
41. securing means With reference to FIG. 1, a side perspective view of the riding lawnmower outrigger of the present invention installed on a riding lawnmower is shown. The riding lawnmower outrigger, generally 1 includes an outer tube 5 secured to a riding lawnmower 2, preferably beneath a riding lawnmower base 3, an inner tube 6 which is telescopingly adjustable within the outer tube 5, a vertical tube 11 connected to the inner tube 6, a handle 8 connected at one end of the vertical tube 11 and an outrigger wheel 7 connected to an opposite end of the vertical tube 11. A spring 14 may wrap around the vertical tube 11 at a location adjacent to the outrigger wheel 7 to act as a shock absorber when the riding lawnmower 2 is used on ground surfaces. The riding lawnmower outrigger 1 is preferably secured to a riding lawnmower 2 at a substantially perpendicular angle to the riding lawnmower 2 to provide maximum support when the riding lawnmower 2 is used on a ground surface 32 having a slope 31 (see FIG. 7). When the riding lawnmower tires 4 move in a predetermined direction, the outrigger wheel 7 also moves in the same predetermined direction. For instance, if the riding lawnmower 2 moves in a forward direction, then the outrigger wheel 7 also moves in a forward direction. Conversely, if the riding lawnmower 2 moves in a reverse direction, the outrigger wheel 7 also moves in a reverse direction.

Figure 2:
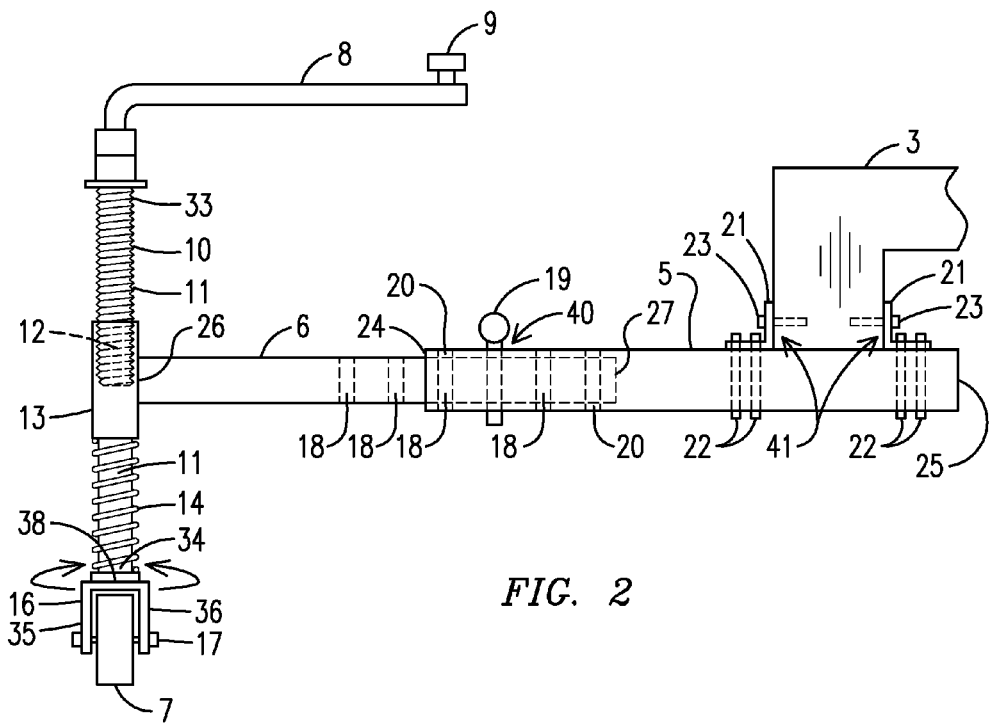
FIG. 2 is a front plan view of the riding lawnmower outrigger of the present invention.

With respect to FIG. 2, a front plan view of the riding lawnmower outrigger of the present invention is shown. The riding lawnmower outrigger 1 of the present invention includes an outer tube 5 having an outer tube first end 24 and an outer tube second end 25, an inner tube 6 having an inner tube first end 26 and an inner tube second end 27. The outer tube 5 is preferably hollow having a predetermined cross-sectional shape, which is preferably square but which also may be any other shape, and the inner tube 6 preferably has the same predetermined cross-sectional shape as the outer tube 5. The outer tube 5 preferably includes at least one outer tube aperture 20 while the inner tube 6 preferably includes at least one inner tube aperture 18. When the inner tube 6 is secured within the outer tube 5, a locking means 40, which is preferably a pin 19, is used to lock the inner tube 6 at a predetermined position within the outer tube 5. The pin 19 is simply inserted into the desired outer tube aperture 20 and desired inner tube aperture 18 to provide a user with a customized length of the riding lawnmower outrigger 1.

A vertical tube 11 is secured to the inner tube first end 26, preferably via a connection tube 13. The vertical tube 11 has a top end 33 and a bottom end 34 wherein a handle 8 is secured to the top end 33 and a outrigger wheel housing 16 is secured to the bottom end 34. The handle 8 preferably includes a knob 9 for a user to easily grasp and hold the handle 8. Vertical tube threads 10 are located on the vertical tube 11 and correspond with connection tube threads 12 located within the connection tube 13 to permit a user to adjust the height of the vertical tube 11 in order to accommodate a user's armlength. A spring 14 is preferably located on the vertical tube 11 beneath the connection tube 13 and above the outrigger wheel housing 16 to act as a shock absorber.

The outrigger wheel housing 16 includes an outrigger housing first side 35, an outrigger housing second side 36 and an outrigger housing top side 38 which preferably form a C-shape. The outrigger wheel 7 is secured within the outrigger wheel housing 16 by a wheel fastening means 17. The outrigger wheel housing 16 is connected to the bottom end 34 of the vertical tube 11 in such a manner as to provide rotation of the outrigger wheel housing 16 when the handle 8 is manipulated. In the alternative, the outrigger wheel housing 16 may be secured to the vertical tube 11 in such a manner so as to create a caster wheel wherein the outrigger wheel 7 is freely rotational when the riding lawnmower outrigger 1 is used. Because the outrigger wheel housing 16, and thus outrigger wheel 7, is rotational, the outrigger wheel 7 is able to turn when the riding lawnmower 2 turns.

To secure the outer tube 5 to the riding lawnmower 2, a securing means 41 is provided. The securing means 41 is preferably two brackets 21 having an L-shape. The brackets 21 are secured on each side of the riding lawnmower base 3 via bolts 23 which extend through the brackets 21 and riding lawnmower base 3. Clamps 22, which are preferably C-shaped, hold the brackets 21 on the outer tube 5 and permit a user to easily adjust the brackets 21 along the outer tube 5 to create a space wide enough to accommodate the riding lawnmower base 3.

Figure 3:
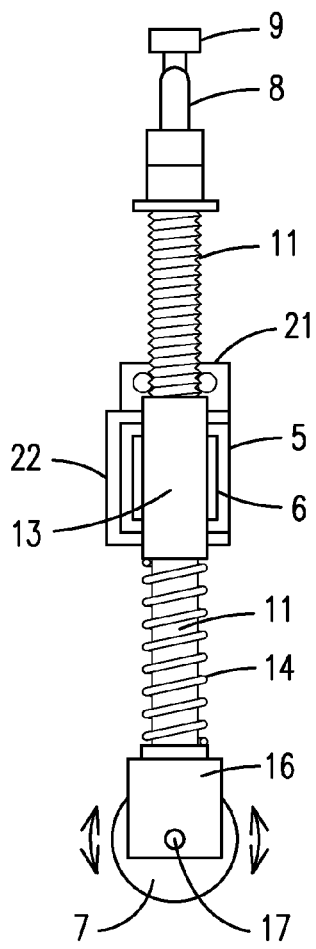
FIG. 3 is a side view of the embodiment of FIG. 2.

Next, FIG. 3 shows a side view of the embodiment of FIG. 2. The outrigger wheel 7 moves in a predetermined direction, depending upon which direction a riding lawnmower is moving, the predetermined direction which may be forward or reverse.

Figure 4:
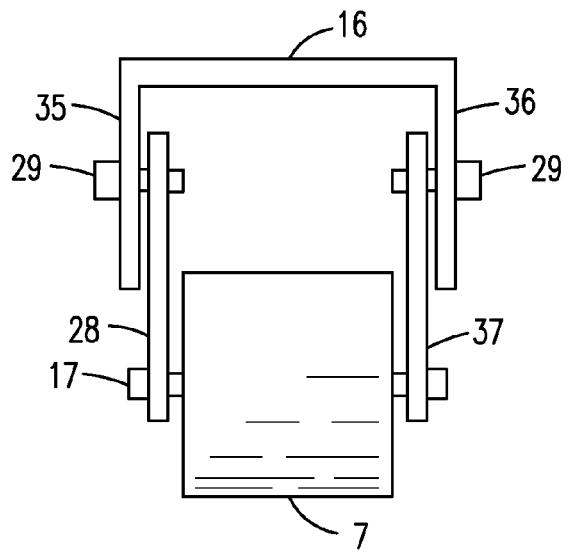
FIG. 4 is front view of a pivotal wheel used on the riding lawnmower outrigger of the present invention.

FIG. 4 shows front view of a pivotal wheel used on the riding lawnmower outrigger of the present invention. Similar to the outrigger wheel 7 and outrigger wheel housing 16 described above, the pivotal outrigger wheel 7 is secured between the outrigger wheel housing first side 35 and the outrigger wheel housing second side 36. However, a first plate 28 is secured between the outrigger wheel housing first side 35 and the outrigger wheel 7 and a second plate 37 is secured between the outrigger wheel housing second side 36 and the outrigger wheel 7 by a pivotal retaining means 29. A wheel fastening means 17 secures the outrigger wheel 7 between the first plate 28 and the second plate 37.

Figure 5:
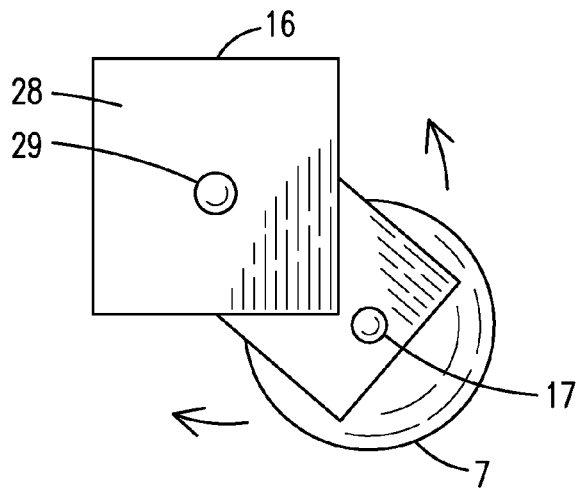
FIG. 5 is a side view of the embodiment of FIG. 4.

In FIG. 5, a side view of the embodiment of FIG. 4 is shown. Because the outrigger wheel 7 is secured within the first plate 28 and second plate 37 (not shown) and the plates 28 and 37 are secured to the outrigger wheel housing 16 by a pivotal retaining means 29, the plates 28 and 37, and thus outrigger wheel 7, are pivotal in an upward and downward direction. The pivotal movement of the outrigger wheel 7 permits a wider range of use of the riding lawnmower outrigger 1 on ground surfaces having various topographies.

Figure 6:
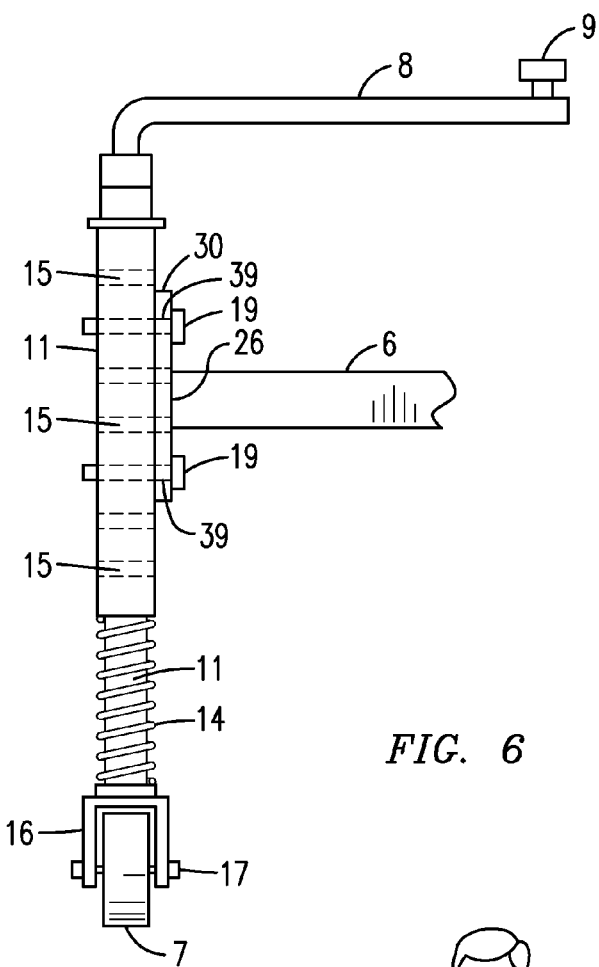
FIG. 6 is a side plan view of an alternate embodiment of the riding lawnmower outrigger of the present invention.

FIG. 6 shows a side plan view of an alternate embodiment of the riding lawnmower outrigger of the present invention. Similar to the aforementioned riding lawnmower outrigger 1, this embodiment of the riding lawnmower outrigger 1 of the present invention includes an inner tube 6 and an outer tube 5 which is securable to a riding lawnmower 2 (not shown). However, this embodiment includes a plurality of vertical tube apertures 15 extending through the vertical tube 11. In addition, as opposed to having a connection tube 13 as shown in FIGS. 1-3, this embodiment of the present invention includes a vertical tube plate 30 having at least one vertical tube plate aperture 39 secured on the inner tube first end 26. In this manner, a user may adjust the height of the vertical tube 11 by inserting a pin 19 into the vertical tube plate apertures 39 and the desired vertical tube apertures 15.

Figure 7:
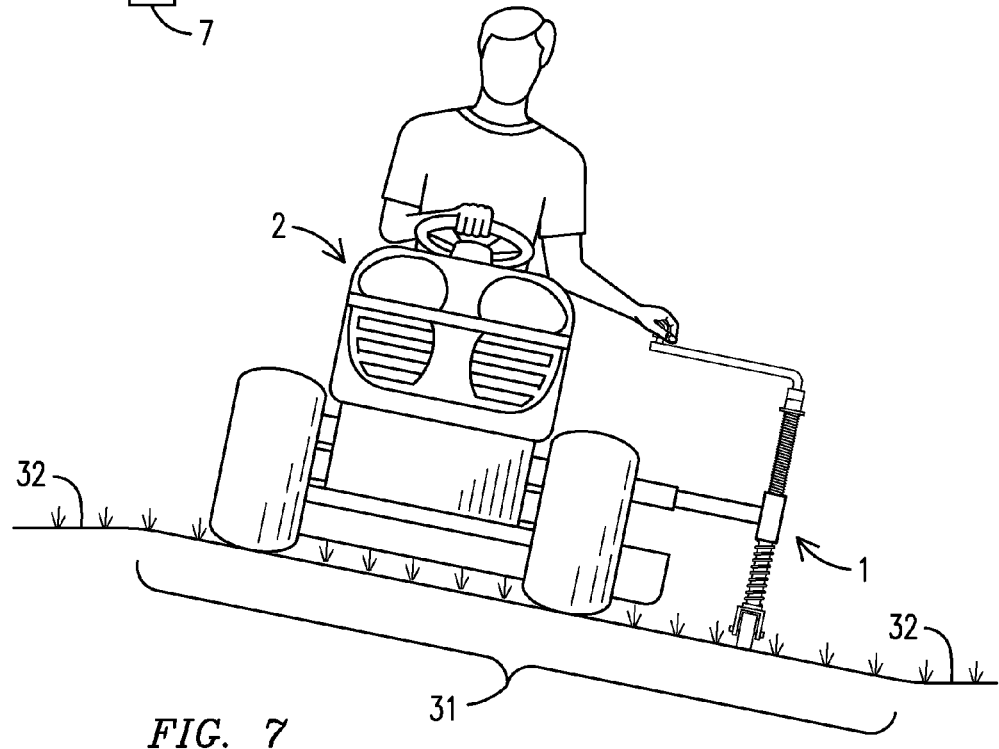
FIG. 7 is a front view of the riding lawnmower outrigger of the present invention in use on a sloped ground surface.

Finally, FIG. 7 shows a front view of the riding lawnmower outrigger of the present invention in use on a sloped surface. Because the riding lawnmower outrigger 1 extends a predetermined distance away from a riding lawnmower 2, the riding lawnmower outrigger 1 acts as a support arm to balance the riding lawnmower 2 when used on a ground surface 32 having a slope 31.

The use of the present invention will prevent tipping of a riding lawnmower when used on sloped ground surfaces.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. An outrigger for a riding lawnmower comprising:
    a hollow outer tube having a predetermined cross-sectional shape;
    said outer tube having a first end and a second end;
    an inner tube having a predetermined cross-sectional shape;
    said inner tube having a first end and a second end wherein said inner tube is slidably extendable within said outer tube;
    at least one aperture extending through said outer tube;
    at least one aperture extending through said inner tube;
    a removable pin having a predetermined length which extends through said at least one outer tube aperture and through said at least one inner tube aperture to lock said inner tube within said outer tube;
    a bracket secured to said outer tube wherein said bracket is securable to a riding lawnmower;
    a vertical tube connected to said inner tube first end;
    said vertical tube having a top end and a bottom end;
    a handle secured to said vertical tube top end;
    at least one rotatable outrigger wheel housing having a top side, a first side and a second side;
    a spring wrapped around said vertical tube adjacent to said outrigger wheel housing;
    a first plate having a predetermined size and shape;
    a second plate having a predetermined size and shape;
    said first plate is secured to said at least one outrigger wheel housing first side;
    said second plate is secured to said at least one outrigger wheel housing second side; and
    at least one wheel secured to said first plate and said second plate such that said at least one wheel rolls in a predetermined direction and is pivotal.

2. An outrigger for a riding lawnmower comprising:
    a hollow outer tube having a predetermined cross-sectional shape;
    said outer tube having a first end and a second end;
    an inner tube having a predetermined cross-sectional shape;
    said inner tube having a first end and a second end wherein said inner tube is slidably extendable within said outer tube;
    at least one aperture extending through said outer tube;
    at least one aperture extending through said inner tube;
    a removable pin having a predetermined length which extends through said at least one outer tube aperture and through said at least one inner tube aperture to lock said inner tube within said outer tube;
    a bracket secured to said outer tube wherein said bracket is securable to a riding lawnmower;
    a vertical tube connected to said inner tube first end;
    said vertical tube having a top end and a bottom end;
    at least one aperture extending though said vertical tube;
    a vertical tube plate secured to said inner tube first end;
    at least one aperture located on said vertical tube plate;
    at least one pin is inserted through said vertical tube plate aperture and said vertical tube to lock said vertical tube against said inner tube;
    a handle secured to said vertical tube top end;
    at least one rotatable outrigger wheel housing having a top side, a first side and a second side;
    a spring wrapped around said vertical tube adjacent to said outrigger wheel housing;
    at least one wheel secured to said first plate and said second plate such that said at least one wheel rolls in a predetermined direction and is pivotal.

\* \* \* \* \*